US008202832B2

(12) United States Patent
Cheng et al.

(10) Patent No.: US 8,202,832 B2
(45) Date of Patent: Jun. 19, 2012

(54) NANO-CLAY COMPOSITE AND COMPOSITION FOR FABRICATING THE SAME

(75) Inventors: Hung-Chiao Cheng, Hsinchu (TW); Wen-Hann Jou, Taipei County (TW); Yeu-Kuen Wei, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 136 days.

(21) Appl. No.: 12/155,869

(22) Filed: Jun. 11, 2008

(65) Prior Publication Data

US 2009/0105112 A1  Apr. 23, 2009

(30) Foreign Application Priority Data

Oct. 23, 2007  (TW) ................................ 96139642 A

(51) Int. Cl.
*C11D 3/37*  (2006.01)
(52) U.S. Cl. .................. 510/395; 510/353; 424/327
(58) Field of Classification Search .................. 510/353; 422/327
See application file for complete search history.

(56) References Cited

U.S. PATENT DOCUMENTS

| 3,692,618 | A | * | 9/1972 | Dorschner et al. | 442/401 |
|---|---|---|---|---|---|
| 5,382,400 | A | * | 1/1995 | Pike et al. | 264/168 |
| 2005/0159063 | A1 | * | 7/2005 | Hill et al. | 442/327 |
| 2007/0179236 | A1 | * | 8/2007 | Landon | 524/445 |

FOREIGN PATENT DOCUMENTS

| CN | 1358791 A | 7/2002 |
|---|---|---|
| JP | 10-024426 | 1/1998 |
| JP | 2005-220209 | 8/2005 |
| JP | 2007-077183 | 3/2007 |

OTHER PUBLICATIONS

Clay Bar Surface Cleaner of Chemical Guy Manufacturing Co. (May 17, 2005).*

* cited by examiner

*Primary Examiner* — Mark Eashoo
*Assistant Examiner* — M. Reza Asdjodi
(74) *Attorney, Agent, or Firm* — Bacon & Thomas, PLLC

(57) ABSTRACT

The present invention relates to a nano-clay composite and a composition for fabricating the same. The nano-clay composite of the invention is formed by compounding a composition comprising a polymer, a surfactant, a polymer modification component, and micro/nano powders. The nano-clay composite is flexible to completely adhere to cleaning surfaces to remove unwanted materials via the release of surfactant, as well as the scrubbing effect produced by the friction between micro/nano powders and the surface.

20 Claims, No Drawings

NANO-CLAY COMPOSITE AND COMPOSITION FOR FABRICATING THE SAME

FIELD OF THE INVENTION

The present invention relates to a flexible nano-clay composite. Preferably, the present invention relates to a nano-clay composite to be used for household, automobile, as well as industrial cleaning purposes.

BACKGROUND OF THE INVENTION

Cleaning is an essential part of daily routine in both the industrial and household settings. As for general household cleaning, the present procedure typically involves mixing the detergent with water, followed by scrubbing using cleaning sponges or other equipments. However, the remaining active detergent after cleaning is usually disposed, and scrubbing equipments may induce damages to the surface or not enough to clean the surface. Furthermore, in automobile beauty aspect, since the surface of vehicles would inevitably be impacted by rocks or particulates with particles in the air during driving, forming the rough surface is difficult to be removed by conventional foam wash procedures. In addition, the friction generated by the adhesive rocks or particulates may further induce damages to the automobile paint.

In the industrial aspect, various cleaning procedures are utilized to increase the qualification lot yields. For example, various Chemical Mechanical Planarization (CMP) methods are used to polish silicon wafer in semiconductor processing, in which large amounts of polishing slurry and water would be consumed. Therefore, the waste polishing slurry treatment has become a severe environmental issue.

Accordingly, the present invention is aiming at providing a solventless/almost solventless cleaning material to reduce the use of water/solvents in industrial, household, or automobile cleaning, with additional scrubbing and surfactant activities in order to reduce potential pollutions.

SUMMARY OF THE INVENTION

In view of the drawbacks of the prior art, one objective of the present invention is to provide a non-consuming cleaning composite, for which the flexibility of the composite would facilitate cleaning by tight adhesion with the attached unwanted stains and remove such materials through the chemical affinity and/or mechanical force under solventless or almost solventless conditions. Furthermore, the other objective of the present invention is to provide a composition for the formation of said flexible, non-consuming cleaning composite, for which can be yielded through compounding.

In order to fulfill said objectives, the present invention is providing a composition which can be used to fabricate a flexible nano-clay composite, comprising a polymer, a surfactant, a polymer modification component, and micro/nano powders. The preferred ratio for each of the components is 100 parts by weight of the polymer, 0.1 to 40 parts by weight of the surfactant, 0.1 to 40 parts by weight of the modifier, and 0.1 to 100 parts by weight of the micro/nano powder.

In some embodiments of the present invention, said composition used to fabricate the composite can further comprise a fiber material, and the preferred amount of said fiber material is 0.1 to 10 parts by weight.

In the preferable embodiment of the present invention, the composition comprises 100 parts by weight of the polymer, 0.1 to 40 parts by weight of the surfactant, 0.1 to 40 parts by weight of the polymer modification component, 0.1 to 100 parts by weight of the micro/nano powder, and 0.1 to 8 parts by weight of the fiber material.

In the more preferable embodiment of the present invention, the composition comprises 100 parts by weight of the polymer, 0.5 to 30 parts by weight of the surfactant, 0.5 to 30 parts by weight of the polymer modification component, 0.1 to 50 parts by weight of the micro/nano powder, and 0.1 to 8 parts by weight of the fiber material.

In another more preferable embodiment of the present invention, the composition comprises 100 parts by weight of the polymer, 1 to 20 parts by weight of the surfactant, 1 to 20 parts by weight of the polymer modification component, 0.1 to 25 parts by weight of the micro/nano powder, and 0.5 to 5 parts by weight of the fiber material.

The present invention is also providing a nano-clay composite formed by compounding a composition comprising a polymer, a surfactant, a polymer modification component, and micro/nano powders, for which the resultant nano-clay composite is provided with flexibility. The more preferable combination for the formation of said composition is 100 parts by weight of the polymer, 0.1 to 40 parts by weight of the surfactant, 0.1 to 40 parts by weight of the polymer modification component, and 0.1 to 100 parts by weight of the micro/nano powder.

In some embodiments of the present invention, the nano-clay composite can further comprise a fiber material, and the more preferable amount of said fiber material is 0.1 to 10 parts by weight.

In the more preferable embodiment of the present invention, the composition used for the formation of the nano-clay composite comprises 100 parts by weight of the polymer, 0.5 to 30 parts by weight of the surfactant, 0.5 to 30 parts by weight of the modifier, 0.1 to 50 parts by weight of the micro/nano powder, and 0.1 to 8 weight of the fiber material.

Moreover, in the embodiments where the present invention is fabricated for automobile beauty, industrial ink-print remove, or deodorization purposes, the composition used for the formation of said nano-clay composite comprises 100 parts by weight of the polymer, 1 to 20 parts by weight of the surfactant, 1 to 20 parts by weight of the modifier, 0.1 to 25 parts by weight of the micro/nano powder, and 0.5 to 5 weight of the fiber material.

The composition used for the formation of said nano-clay composite would be able to form flexible nano-clay composites, which can be utilized as non-consuming cleaning materials for industrial and household purposes, reducing the use of consuming cleaning agents such as water and/or other solvents, fulfilling the goal of environmental-friendliness.

DETAILED DESCRIPTION OF THE PREFERABLE EMBODIMENTS

The composition used to fabricate said flexible nano-clay composites in the present invention comprises a polymer, a surfactant, a polymer modification component, and micro/nano powders. The preferred ratio for each of the components is 100 parts by weight of the polymer, 0.1 to 40 parts by weight of the surfactant, 0.1 to 40 parts by weight of the polymer modification component, and 0.1 to 100 parts by weight of the micro/nano powder.

In some embodiments of the present invention, the nano-clay composite can further comprise a fiber material, and the more preferable amount is 0.1 to 10 parts by weight.

In the more preferable embodiment of the present invention, the composition used for the formation of the nano-clay composite comprises 100 parts by weight of the polymer, 0.5 to 30 parts by weight of the surfactant, 0.5 to 30 parts by weight of the polymer modification component, 0.1 to 50 parts by weight of the micro/nano powder, and 0.1 to 8 weight of the fiber material.

In another more preferable embodiment of the present invention, the composition comprises 100 parts by weight of the polymer, 1 to 20 parts by weight of the surfactant, 1 to 20 parts by weight of the modifier, 0.1 to 25 parts by weight of the micro/nano powder, and 0.5 to 5 weight of the fiber material.

The 'polymer' referenced in the present invention is a polymer matrix within the composition used for the formation of the flexible nano-clay composite, where the substrate may either be provided with flexibility, or obtain flexibility through compounding with other components. The suitable material as the polymer component comprises the polyolefin which comprises; polyethylene, polypropylene, poly(vinyl acetate), rubber, or mixture thereof.

The 'surfactant' referenced in the present invention comprises anionic surfactant, cationic surfactant, nonionic surfactant, or mixtures thereof. One purpose of the utilization of surfactant within the composite in the present invention is to induce polar—polar or non-polar—non-polar interactions with substances on the cleaning surface to facilitate the removal process. Furthermore, the surfactant can be released from the composite with cleaning effect. The suitable anionic surfactant for the present invention comprises polyoxyethylene alkyl ether phosphate, carboxylated alkyl ethoxylate, carboxylated dodecyl benzene sulfonate, and ammonium polyoxyethylene alkyl ether sulfate. The suitable cationic surfactant for the present invention comprises quaternary ammonium salt, benzalkonium chloride, and lauryl betain. Finally, the suitable non-ionic surfactant for the present invention comprises polyoxyethylene alkyl ether, polyoxyethylene oleate, polyoxyethylene stearate, or polyoxyethylene laurate.

The 'polymer modification component' referenced in the present invention is a commonly added substance for those skilled in polymer science in order to modify properties such as rigidity, toughness, and flexibility. The suitable modifier for the present invention comprises plastic modifiers, viscosity increasers, hydrocarbon petroleum, plant oil, animal oil, or mixtures thereof, which can be used to modify said properties. For example, the plastic modifier can be polyethylene glycols, polytetramethylene-ether-glycol, polycaprolactone, polycarbonatediol, di-octyl phthalate, dibutyl phthalate, triacetin, trimethyl-pentanediol di-isobutane, or mixtures thereof. The hydrocarbon petroleum is a compound provided with the structural formula of $C_nH_{2n+2}$, wherein n represents whole numbers from 6 to 30. In addition, the hydrocarbon petroleum can be saturated or unsaturated cycloalkanes, or aromatic compounds.

The 'micro/nano powder' referenced in the present invention is the mixture of nano or micro powder and nano powder, with the purpose of the attached stains removal through contact with unwanted material on the cleaning surface. Through contact with the attached stains, the micro/nano powders contained in the composite would be released and bind to the attached stains on the cleaning surface, further induce the abrasive scrubbing effect, which facilitates the removal of the attached stains. Since the composite is flexible, the attached stains would incorporate into the composite, which can be removed simultaneously from the cleaning surface. The material of the micro powder can be any substances with micro-scale particle radius provided with rigidity and low flexibility; and the material of nano powder can be any substances with nano-scale particle radius, including but not limited to silicon dioxide, titanium dioxide, zinc oxide, calcium carbonate, aluminum oxide, magnesium silicate, or mixtures thereof.

The 'fiber material' referenced in the present invention comprises cotton, pulp, or mixtures thereof.

In some embodiments, the composition used for the formation of the flexible nano-clay composite further comprises functional additives depending on demand, for example calcium hypochlorate, citric acid, or tannic acid, for the enhancement of the composite functionality such as fragrance, degreasing properties.

The nano-clay composite in the present invention is formed from a composition through compounding, wherein the polymer, surfactant, modifier, micro/nano powder, and fiber material are as the same as defined previously.

The 'compounding' referenced in the present invention is referring to a technique, for which the polymer and other components for modifying purposes can be evenly distributed through the utilization of compounding equipments. Such technique may be performed by any of the presently known or specifically designed equipments for such purposes, for example, but not limited to single-screw extruder, twin-screw extruder, disc-mixing extruder, or continuous extruder . . . etc.

In the more preferable embodiment of the present invention, the composition used for the formation of the nano-clay composite comprises 100 parts by weight of the polymer, 0.5 to 30 parts by weight of the surfactant, 0.5 to 30 parts by weight of the modifier, 0.1 to 50 parts by weight of the micro/nano powder, and 0.1 to 8 weight of the fiber material. The composite is suitable for household cleaning purposes, such as furniture, floor, crockery, pot surface, hotplate surface, and automobile beauty, for example wiping before waxing.

In another more preferable embodiment of the present invention, the composition used for the formation of the nano-clay composite comprises 100 parts by weight of the polymer, 1 to 20 parts by weight of the surfactant, 0.1 to 20 parts by weight of the modifier, 0.1 to 25 parts by weight of the micro/nano powder, and 0.5 to 5 weight of the fiber material. The composite mentioned is suitable for industrial deink or deodorizing purposes.

The following examples are used to illustrate the advantages of the present invention, however, these examples are not to be used to limit the scope of the present invention.

EXAMPLE 1

The Preparation of the Nano-Clay Composite

The Nano-Clay Composite for General Cleaning Purposes (More Suitable for Household Cleaning Purposes)

| Material | Material Category | Ratio (parts by weight) |
| --- | --- | --- |
| Polymer | Polybutylene, poly(vinyl acetate) | Total of 100, wherein polybutylene is 1 to 5. |
| Modifier | Glycerol triacetate | 5 to 20 |
| Surfactant | Polyoxyethylene oleate | 5 to 20 |
| Nano powder | Silicon dioxide Particle radius range: 100 nm to 1000 nm | 0.1 to 1 |
| | Aluminum oxide Particle radius range: 100 nm-1000 nm | 0.1 to 1 |
| Other additives | Pulp | 1 to 5 |

The components above are softened in a boiler, further compounded by a single-screw extruder to yield the composite for general cleaning purposes, especially for household cleaning purposes.

The Nano-Clay Composite for Automobile Cleaning Purposes

| Material | Material Category | Ratio (parts by weight) |
| --- | --- | --- |
| Polymer | Polybutylene, poly(vinyl acetate) | Total of 100, wherein polybutylene is 1 to 5 |
| Modifier | Glycerol triacetate | 5 to 20 |
| Surfactant | Polyoxyethylene oleate | 5 to 20 |
| Nano powder | Silicon dioxide Particle radius range: 50 nm to 300 nm | 1 to 20 |
|  | Aluminum oxide Particle radius range: 50 nm to 300 nm | 1 to 20 |
| Other additives | Pulp | 1 to 5 |

The components above are softened in a boiler, further compounded by a single-screw extruder to yield the composite for automobile cleaning purposes.

The Nano-Clay Composite for Industrial Cleaning Purposes (Specific for Cleaning Ink-Print on PU Leather)

| Material | Material Category | Ratio (parts by weight) |
| --- | --- | --- |
| Polymer | Poly(vinyl acetate) | 100 |
| Modifier | Glycerol triacetate | 5 to 20 |
| Surfactant | Polyoxyethylene oleate | 1 to 5 |
| Nano powder | Silicon dioxide Particle radius range: 50 nm to 300 nm | 0.1 to 5 |
|  | Aluminum oxide Particle radius range: 50 nm to 300 nm | 0.1 to 5 |
| Other additives | Pulp | 1 to 5 |
|  | Calcium hypochlorate | 0.1 to 1 |

The components above are softened in a boiler, further compounded by a single-screw extruder to yield the composite for industrial cleaning purposes (specific for cleaning ink on PU leather).

The Nano-Clay Composite for Industrial Purposes (Specific for Deodorizing)

| Material | Material Category | Ratio (parts by weight) |
| --- | --- | --- |
| Polymer | Poly(vinyl acetate) | 100 |
| Modifier | Glycerol triacetate | 1 to 5 |
| Surfactant | Polyoxyethylene oleate | 1 to 10 |
| Nano powder | Activated carbon Particle radius range: 100 nm to 500 nm | 0.1 to 5 |
| Other additives | Pulp | 1 to 5 |
| Functional additives | Citric acid | 0.1 to 1 |
|  | Tannic acid | 0.1 to 1 |

The Nano-Clay Composite with Two Kinds Surfactant (Nonionic and Cationic Surfactant)

| Material | Material Category | Ratio (parts by weight) |
| --- | --- | --- |
| Polymer | Polybutylene, poly(vinyl acetate) | Total of 100, wherein polybutylene is 1 to 5 |
| Modifier | Glycerol triacetate | 5 to 20 |
| Surfactant | Polyoxyethylene oleate、lauryl betain | 5 to 20 |
| Nano powder | Silicon dioxide Particle radius range: 50 nm to 300 nm | 1 to 20 |
|  | Aluminum oxide Particle radius range: 50 nm to 300 nm | 1 to 20 |
| Other additives | Pulp | 1 to 5 |

The Nano-Clay Composite with Two Kinds Surfactant (Nonionic and Anionic Surfactant)

| Material | Material Category | Ratio (parts by weight) |
| --- | --- | --- |
| Polymer | Polybutylene, poly(vinyl acetate) | Total of 100, wherein polybutylene is 1 to 5 |
| Modifier | Glycerol triacetate | 5 to 20 |
| Surfactant | Polyoxyethylene oleate、polyoxyethylene alkyl ether phosphate | 5 to 20 |
| Nano powder | Silicon dioxide Particle radius range: 50 nm to 300 nm | 1 to 20 |
|  | Aluminum oxide Particle radius range: 50 nm to 300 nm | 1 to 20 |
| Other additives | Pulp | 1 to 5 |

The components above are softened in a boiler, further mixed by a single-screw extruder to yield the composite for industrial purposes (specific for deodorizing).

To summarize above examples, the composite of the present invention is provided with flexibility, which may completely attach to the cleaning surface to scrub off the attached stains. Moreover, the release of the surfactant and the micro/nano powders would enhance the attachment, and induce scrubbing effect correspondingly, which would be able to reduce the disposal of the remained active cleaning agents.

OTHER EMBODIMENTS

All characteristics disclosed in this specification may be combined with other methods, also selectively replaced by characteristics of the same, equivalent, or similar purposes. Therefore, excluding those especially remarkable characteristics, all the characteristics are simply examples of the equivalent or similar characteristics.

The present invention has been exemplified by the more preferable embodiments as previously mentioned. However, these examples are not used to limit this invention, and those skilled in the art can make a variety of alterations and modifications without departing the spirit and scope of this invention.

What is claimed is:

1. A flexible nano-clay cleaning composite, comprising:
100 parts by weight of a polyolefin;
0.1 to 40 parts by weight of a surfactant;

0.1 to 40 parts by weight of a polymer modification component, and 0.1 to 40 parts by weight of micro/nano powders;

wherein said polyolefin, said surfactant, said polymer modification component and said micro/nano powders are evenly distributed and mixed with each other throughout said composite by compounding.

2. The flexible nano-clay cleaning composite according to claim 1, further comprising a fiber material evenly distributed and mixed with said polyolefin, said surfactant, said polymer modification component and said micro/nano powders throughout said composite.

3. The flexible nano-clay cleaning composite according to claim 2, wherein the amount of said fiber material is 0.1 to 10 parts by weight.

4. The flexible nano-clay cleaning composite according to claim 3, wherein said fiber material comprises cotton, pulp or mixtures thereof.

5. The flexible nano-clay cleaning composite according to claim 3, comprising:

100 parts by weight of the polyolefin;

0.5 to 30 parts by weight of the surfactant;

0.5 to 30 parts by weight of the polymer modification component;

0.1 to 50 parts by weight of the micro/nano powders; and 0.1 to 8 parts by weight of the fiber material.

6. The flexible nano-clay cleaning composite according to claim 5, comprising:

100 parts by weight of the polyolefin;

1 to 20 parts by weight of the surfactant;

1 to 20 parts by weight of the polymer modification component;

0.1 to 25 parts by weight of the micro/nano powders; and 0.5 to 5 parts by weight of the fiber material.

7. The flexible nano-clay cleaning composite according to claim 6, wherein the micro/nano powder is a mixture of silicon dioxide and aluminum oxide having a particle size range of from 100 to 1000 nm.

8. The flexible nano-clay cleaning composite according to claim 7, wherein the polymer is a mixture of polybutylene and poly(vinylacetate).

9. The flexible nano-clay cleaning composite according to claim 1, wherein said polyolefin comprises:

polyethylene, polypropylene, poly(vinyl acetate), rubber, or mixtures thereof.

10. The flexible nano-clay cleaning composite according to claim 1, wherein said surfactant comprises anionic surfactant, cationic surfactant, nonionic surfactant, or mixtures thereof.

11. The flexible nano-clay cleaning composite according to claim 10, wherein the anionic surfactant comprises polyoxyethylene alkyl ether phosphate, carboxylated alkyl ethoxylate, carboxylated dodecyl benzene sulfonate, or ammonium polyoxyethylene alkyl ether sulfate.

12. The flexible nano-clay cleaning composite according to claim 10, wherein the cationic surfactant comprises quaternary ammonium salt, benzalkonium chloride, or lauryl betain.

13. The flexible nano-clay cleaning composite according to claim 10, wherein the nonionic surfactant comprises polyoxyethylene alkyl ether, polyoxyethylene oleate, polyoxyethylene stearate, or polyoxyethylene laurate.

14. The flexible nano-clay cleaning composite according to claim 1, wherein the polymer modification component comprises a plastic modifier, an antibacterial agent, a viscosity increaser, hydrocarbon petroleum, plant oil, and animal oil or mixtures thereof.

15. The flexible nano-clay cleaning composite according to claim 14, wherein the plastic modifier comprises polyethylene glycols, polytetramethylene-ether-glycol, polycaprolactone, polycarbonatediol, di-octyl phthalate, dibutyl phthalate, triacetin, or trimethyl-pentanediol di-isobutylate or mixtures thereof.

16. The flexible nano-clay cleaning composite according to claim 14, wherein the hydrocarbon petroleum is a compound provided with the structural formula of $C_nH_{2n+2}$, wherein n represents whole numbers from 6 to 30.

17. The flexible nano-clay cleaning composite according to claim 1, wherein the material of said micro/nano particles comprises silicon dioxide, titanium dioxide, zinc oxide, calcium carbonate, aluminum oxide, magnesium silicate, or mixtures thereof.

18. The flexible nano-clay cleaning composite according to claim 1, wherein the radius of said micro/nano powder particle is 50 nm to 900 nm.

19. The flexible nano-clay cleaning composite according to claim 1, further comprising a functional additive.

20. The flexible nano-clay cleaning composite according to claim 19, wherein said functional additive comprises calcium hypochlorate, citric acid or tannic acid.

* * * * *